April 23, 1935. A. R. KELLER 1,999,009
ELEVATING EQUIPMENT FOR WORT STRAINERS
Filed Jan. 2, 1934 4 Sheets-Sheet 1

INVENTOR
Andreas R. Keller.
By Dyrenforth, Lee, Chritton & Wiles,
Attys.

April 23, 1935.   A. R. KELLER   1,999,009
ELEVATING EQUIPMENT FOR WORT STRAINERS
Filed Jan. 2, 1934   4 Sheets-Sheet 2

April 23, 1935. A. R. KELLER 1,999,009
ELEVATING EQUIPMENT FOR WORT STRAINERS
Filed Jan. 2, 1934 4 Sheets-Sheet 3

INVENTOR
Andreas R. Keller.
By Dyrenforth, Lee, Chritton & Wiles.
Attys.

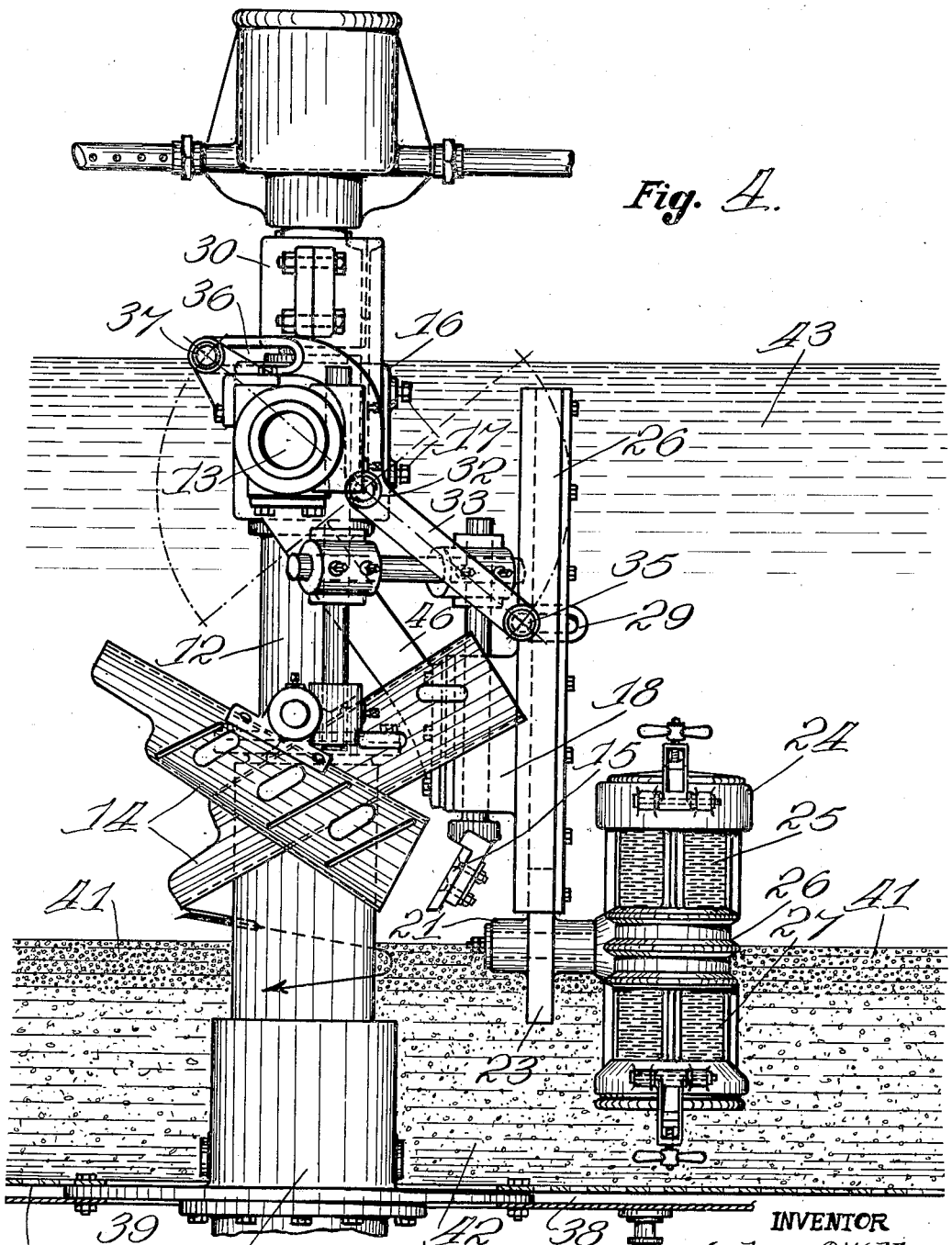

Patented Apr. 23, 1935

1,999,009

UNITED STATES PATENT OFFICE 1,999,009

ELEVATING EQUIPMENT FOR WORT STRAINERS

Andreas R. Keller, Lombard, Ill.

Application January 2, 1934, Serial No. 705,022

7 Claims. (Cl. 210—151)

My invention relates to mash and strainer tanks as used in the brewing industry and, more particularly, to novel means for interrelation between the strainer and the agitating mechanism.

My machine is designed to increase the efficiency of such tanks by improving the mixing, straining and drawing off features, thereby overcoming certain disadvantages of the equipment now in use.

Still other objects will appear from the following specification and from the accompanying drawings, in which—

Figure 1:
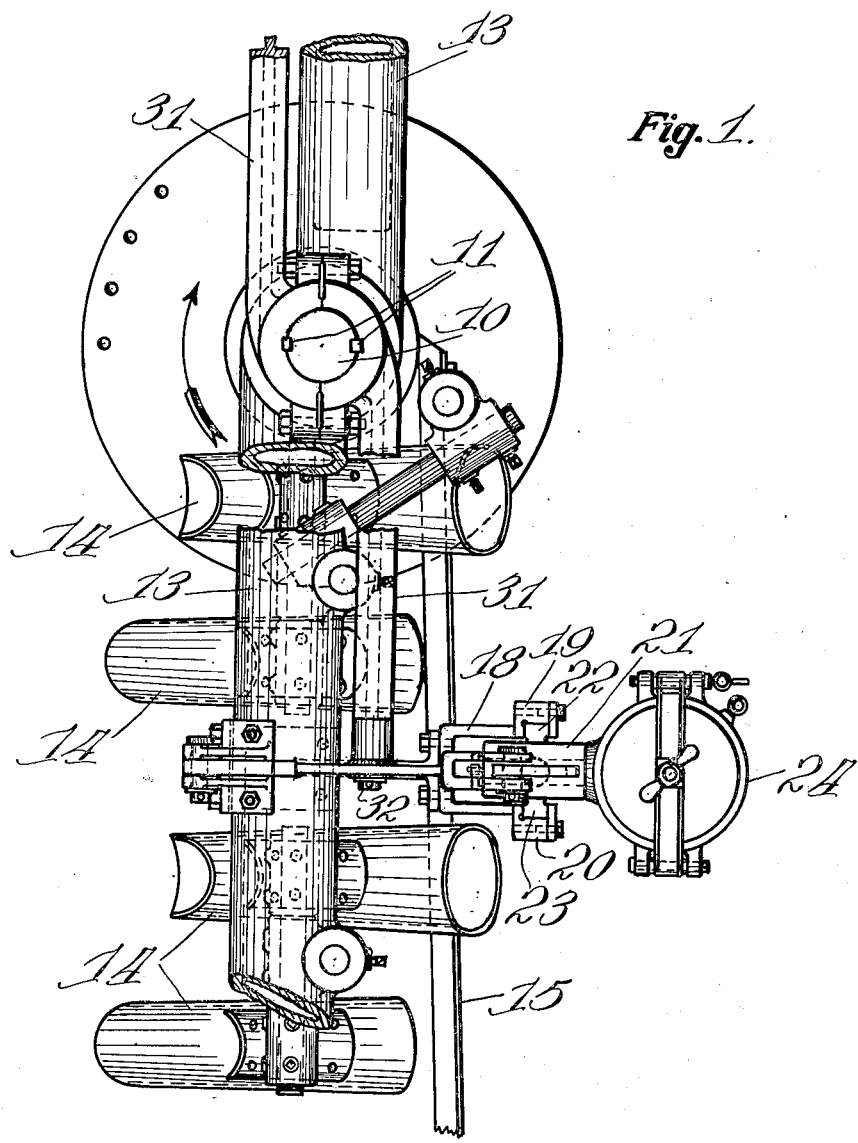
Figure 2:
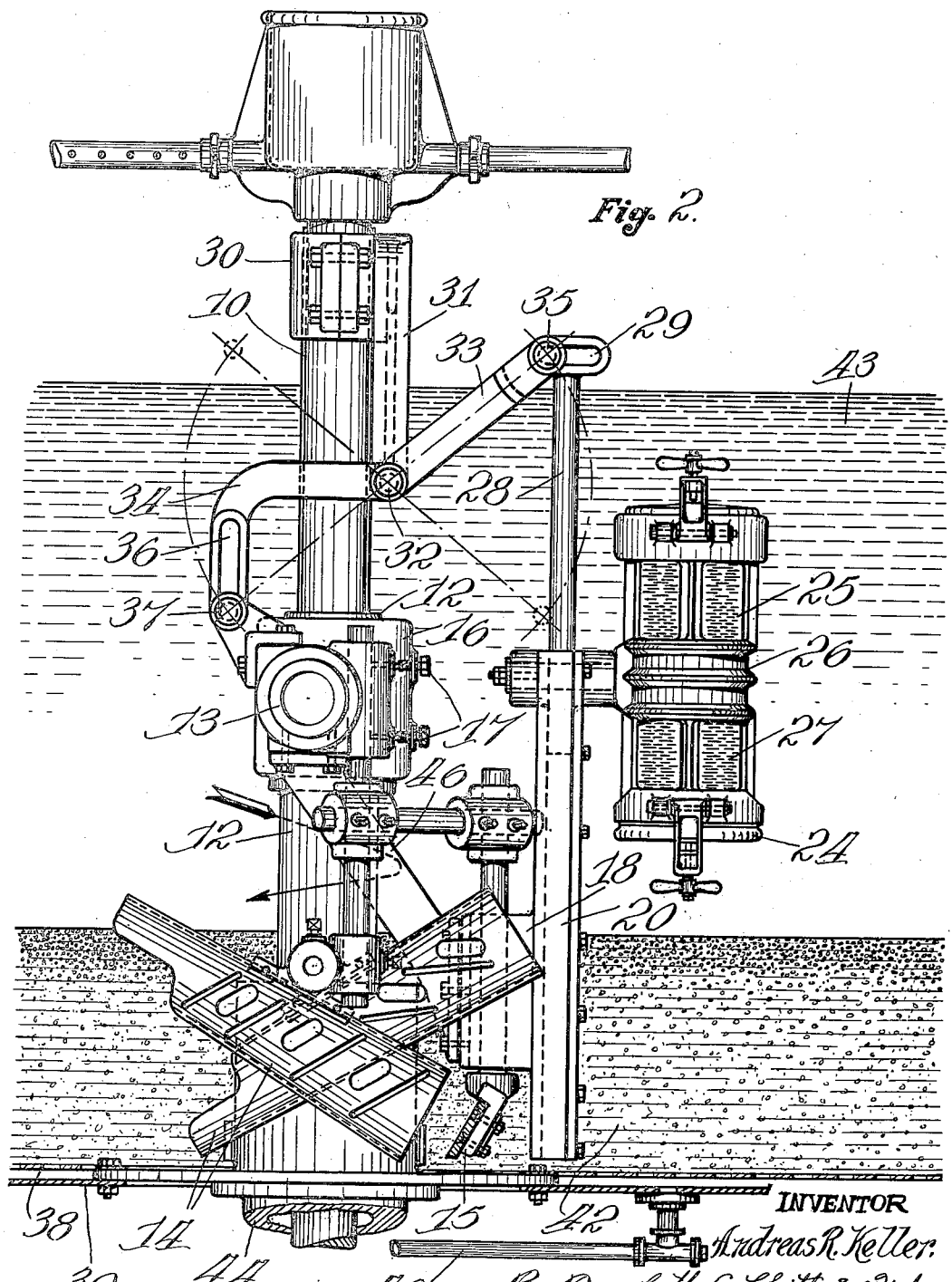
Figure 3:
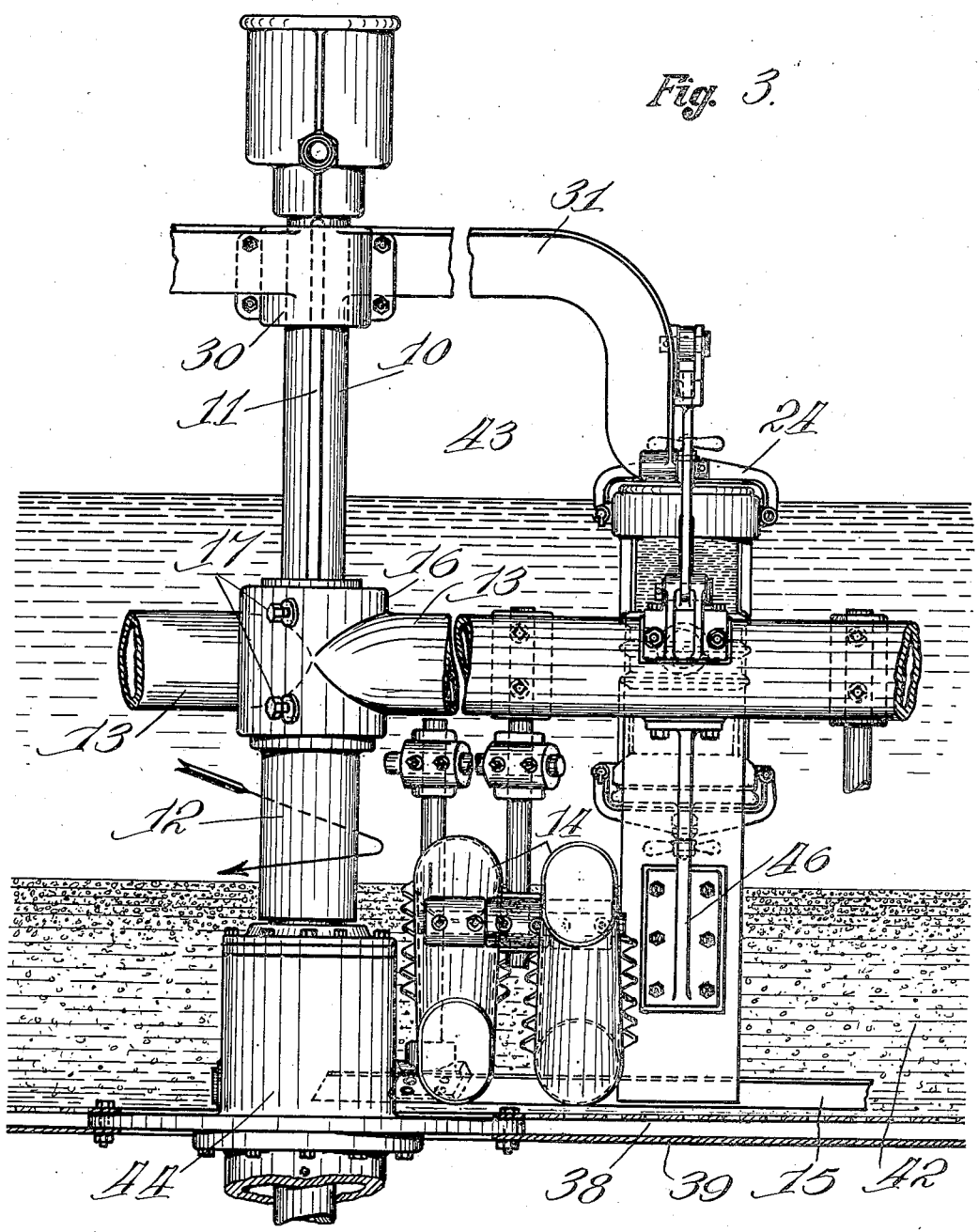

Figure 1 is a fragmentary top plan view; Fig. 2 is a side elevation showing the agitating and straining equipment in the mixing position; Fig. 3 is a front elevation of the same equipment; and Fig. 4 is a side elevation of the agitating and straining equipment when in position for straining the wort.

To fully understand the present invention, it is necessary to consider the difficulties which are encountered in this type of equipment. The mash in the tank is thoroughly stirred and mixed by means of mechanical agitators in order to permit a proper circulation of the wort. These mechanical agitators crush and bruise a certain amount of the grain in said mash and force therefrom small glutinous particles. After the mixing operation has been finished and straining is about to commence, the grain settles to the bottom of the tank and the glutinous particles form a thin layer of material on the top of the grain which is almost impenetrable to the liquid wort above. This results in very slow drainage of the wort through this layer and out of the tank. In order to obviate this difficulty, tubular strainers are now in use, which tubular strainers are forced down through the glutinous screen or "upper-dough" 41, as it is known in the trade, and permit a swifter drainage of the wort from the tank. These strainers must be kept out of the path of the agitating and mixing mechanism and, therefore, are usually raised out of the tank when mixing is going on. This requires separate lifts and apparatus, whereas my invention permits the strainers to be carried on the same central shaft as the agitators and to be raised or lowered automatically in conjunction with said agitators.

With reference to the drawings, the central drive shaft 10 of the tank has in it keyways 11 on which slide the sleeve 12. This sleeve 12 has at its upper extremity a collar 16 rigidly yet removably fastened by bolts 17, which collar carries arms 13. From the arms 13 depend the agitators 14 and the scraper 15. Each arm has a bar 46 projecting downwardly and outwardly therefrom and at the lower end of such bar there is a horseshoe shaped bracket 18, said bracket lying parallel with the bottom of the tank and having its opening facing away from the agitators. The ends of the horseshoe carry channel irons 19 and 20. Within such channel irons are rails 22 and 23 fastened to a carriage 21. This carriage supports the strainer 24. The carriage 21 has projecting upwardly therefrom a connecting rod 28 having a horizontally slotted top 29.

The drive shaft 10 has attached near its upper extremity a collar 30 carrying a bar 31 which projects outwardly parallel to the arms 13 and slightly downwardly. The bar 31 has at its extremity a pivot 32 which carries a bell crank composed of a straight arm 33 and a right-angled arm 34. The arm 33 is attached at its outward end to the rod 28 by the coupling 35 in the slot 29. The right-angled arm 34 has in its outward end a slot 36 in which rides a pivot coupling 37 connecting it with the collar 16. The slotted couplings are necessary because of the fact that the rod 28 and the sleeve 12 travel vertically, whereas the pivot couplings 37 and 35 must pass through arcs of a circle having its center at pivot 32.

In operation my device acts as follows. When the mash is being mixed, the sleeve 12 is at its lowest position and the strainer 24 is at its highest position. In this manner the agitators 14 revolve in the mash or grain, whereas the strainer 24 revolves only through the liquid wort and thus offers little resistance. When mixing has been completed, a hydraulic lift 44 raises the sleeve 12 on the shaft 10. The raising of the sleeve 12 transmits motion through the bell crank 33 to the connecting rod 28 which forces the carriage 21 and the strainer 24 down to their lowest position. Although the raising of the sleeve 12 necessarily carries up with it the guiding channel irons 19 and 20, said channel irons are long enough that even in their raised position they are in supporting relation to the guided rails 22 and 23, and said channel irons are, furthermore, so positioned that the arm 33 may pass down between them. In this position, as illustrated in Fig. 4, the agitators 14 are raised out of the mash, whereas the strainer 24 has its upper cylindrical screen 25 in the wort, its central cylindrical partition 26 at the level of the upper dough, and its lower screen 27 well down into the mash. The wort 43 may thus pass through the screen 25, down through the center of the cylinder 26, out the screen 27 into the mash 42, and thus through the false bottom 38 and out the real bottom 39 into the wort pipe 40, without having had to filter through the glutinous film or upper dough 41. When the wort has been strained from the tank and it is desired to again drop the agitators and raise the strainer, power applied to the sleeve 12 again performs both functions through the medium of the bell crank transmission of motion.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. In combination with a mash and strainer tank of the character described; a central power shaft; a sleeve slidably mounted on said power shaft; means for sliding said sleeve arms carried by said sleeve; agitators and scrapers depending from said arms; brackets having connection with said arms; vertically positioned channel irons attached to said brackets; a carriage slidably splined to said channel irons; a wort straining device attached to said carriage; a connecting rod extending upwardly from said carriage; a bell crank mechanism intermediately pivoted to a support fixed with regard to vertical movement; means connecting one of said arms to said bell crank on one side of said pivot; and means connecting said connecting rod to said bell crank on the opposite side of said pivot, whereby lifting said sleeve to remove said agitators and scrapers from the mash lowers said straining device into said mash.

2. In combination with a mash and strainer tank of the character described; a central power shaft; a sleeve slidably mounted on said power shaft; hydraulic lifting means connected to said sleeve arms carried by said sleeve; agitators and scrapers depending from said arms; brackets having connection with said arms; vertically positioned channel irons attached to said brackets; a carriage slidably splined to said channel irons; a wort straining device attached to said carriage; a connecting rod extending upwardly from said carriage; a bracket rigidly attached to said central power shaft; a bell crank pivoted at its center to said bracket; and slotted pivotal couplings connecting the bell crank to one of said arms and to said connecting rod, whereby lifting said sleeve to remove said agitators and scrapers from the mash lowers said straining device into said mash.

3. In combination with a tank of the character described; a power shaft; mixing means driven by said shaft and connected to means in combination with said shaft whereby vertical motion of said mixing means may be effected; a substantially cylindrical wort straining device; and connecting means between said mixing means and said straining device, said means comprising a bell crank, intermediately pivoted to a support fixed with regard to vertical movement and connected on one side of the pivot to said mixing means and on the other side of said pivot to said straining device whereby said device is held raised when said mixing means are operating, and is lowered to operative position in the mash in said tank when said mixing means are raised.

4. In combination with a mash and strainer tank of the character described; mixing and agitating equipment; a wort straining device; and connecting means between said equipment and said straining device comprising an intermediately pivoted lever on a vertically fixed support, said lever being connected to said equipment on one side of the pivot thereof and to said straining device on the other side of said pivot, whereby the raising of said mixing equipment automatically lowers said straining device into the mash in said tank, and vice versa.

5. In combination with a mash and strainer tank of the character described; a central shaft; agitating and mixing equipment in connection with said central shaft; a wort straining device; and a connecting lever between said equipment and said straining device intermediately pivoted on a vertically fixed support, said lever being connected to said equipment on one side of the pivot thereof and to said straining device on the other side of said pivot, whereby vertical motion of said mixing equipment automatically causes an opposite vertical motion of said straining device to lower said device into the mash in said tank when said equipment is raised.

6. In combination with a mash and strainer tank of the character described; a central power shaft; a sleeve slidably mounted on said power shaft; agitating and mixing equipment in connection with said sleeve; a wort straining device; and connecting means between said equipment and said device, said means being intermediately pivoted on a vertically fixed support and being connected to said equipment on one side of the pivot thereof and to said device on the other side of said pivot, whereby a vertical motion of said mixing equipment effectuates an opposite vertical motion of said wort straining device to lower said device into the mash in said tank when said equipment is raised.

7. In combination with a mash and strainer tank of the character described; a sleeve slidably mounted on said power shaft; means for sliding said sleeve on said shaft; arms carried by said sleeve; agitators and scrapers depending from said arms; vertically positioned channel irons connected to said arms; a carriage slidably splined to said channel irons; a wort straining device attached to said carriage; and means comprising an intermediately pivoted lever on a vertically fixed support, one end of said lever being connected to one of said arms and the other end of said lever being connected to said carriage, whereby a vertical motion of said agitators and scrapers automatically effectuate an opposite vertical motion of said wort strainer to hold said strainer raised when said agitators and scrapers are in operative position and to lower said strainer into the mash in said tank when said agitators and scrapers are raised.

ANDREAS R. KELLER.